3,043,815
COPOLYMERS OF 1,1-DIHYDROPERFLUORO-
ALKENE-1 AND PROCESS FOR PREPARA-
TION THEREOF
Billy F. Landrum and Carl Sandberg, St. Paul, Minn., assignors to Minnesota Mining and Manufacturing Company, St. Paul, Minn., a corporation of Delaware
No Drawing. Filed Mar. 6, 1959, Ser. No. 797,567
6 Claims. (Cl. 260—87.5)

This invention relates to new polymeric materials, particularly to polymers obtained from tetrafluoroethylene.

The polymerization of tetrafluoroethylene has been utilized to produce a hard, tough, thermally stable, polymer which is insoluble in and unaffected by inorganic acids, alkali and organic solvents. While this combination of properties has been found to be desirable for a great many applications, the same properties make the polymer unacceptable for other uses. Thus, for example, the properties of polytetrafluoroethylene are such as to make molding, flowing or extrusion of the polymer impractical. Generally, it has been necessary to employ such techniques as aggregating finely divided particles of polytetrafluoroethylene resin to obtain the desired shape, as in a "preform," and fusing or sintering the preform at temperatures above 327° C., to coalesce the aggregated particles into a solid, cohesive, though often porous, mass. This technique is described in U.S. No. 2,400,099.

For applications such as molding and extruding, the physical characteristics of the polymer being worked should include a crystalline melting temperature ($Tm$) in the range of about 250–300° C. and most preferably in the range of 270–290° C. Such $Tm$ values permit the use of apparatus and process conditions conventionally employed for molding and extruding. When using tetrafluoroethylene homopolymers, the $Tm$ lies above the degradation temperature and the polymers can be made to flow only with great difficulty at lower temperature, and then only with the use of high pressures. Modifying the nature of the tetrafluoroethylene polymer by adding a second monomer tends to result in the sacrifice of some desirable properties to obtain others. The second monomer copolymerized with tetrafluoroethylene should therefore preferably alter such properties as moldability of the resultant tetrafluoroethylene copolymer without adversely affecting chemical and thermal resistance. For the above reasons, and additionally because of the cost of suitable comonomers, the amount of the comonomers appearing in the tetrafluoroethylene copolymers should be minimized. Furthermore, the presence of large amounts of a second monomer often tends to impede, and occasionally to prevent, the polymerization reaction.

It is an object of this invention to provide a tetrafluoroethylene polymer with good chemical and thermal stability as well as the ability to be conveniently worked by conventional techniques.

It is a further object of this invention to provide a tetrafluoroethylene copolymer which can be readily molded and extruded.

It is another object of this invention to provide a process for preparing a tetrafluoroethylene copolymer with the above characteristics.

Various other objects and advantages of the present invention will become apparent to those skilled in the art from the accompanying disclosure and description.

According to the present invention, it has been found that the aforesaid objects are achieved by copolymerizing tetrafluoroethylene with a 1,1-dihydroperfluoroalkene-1 having between 4 and 8 carbon atoms, preferably between 4 and 6 carbon atoms, to produce a copolymer thereof containing a minor amount of the 1,1-dihydroperfluoroalkene-1. These copolymers of tetrafluoroethylene and 1,1-dihydroperfluoroalkene-1 retain the desirable properties of the tetrafluoroethylene homopolymer, are relatively high molecular weight thermoplastic resins and additionally are capable of being worked, as in molding and extrusion operations, by conventional techniques. Among the 1,1-dihydroperfluoroalkene-1 compounds are 1,1-dihydroperfluorobutene - 1; 1,1 - dihydroperfluoropentene-1; and 1,1-dihydroperfluorohexene-1, including mixtures thereof.

The novel polymers of this invention are prepared by polymerizing the aforementioned monomers in the presence of a free radical forming polymerization promoter. Promoters which may be used include peroxygen compounds, such as ditertiary butyl peroxide, diacyl peroxide (e.g., benzoyl peroxide), ethyl peroxide, sodium peroxide, hydrogen peroxide, oxygen, ozone and sodium persulfate. Also included are tertiary butyl hydroperoxide, peracetic acid, diacetyl peroxide, trichloroacetyl peroxide, trifluoroacetyl peroxide, and certain azo compounds, such as alpha, alpha'-azo diacetonitrile, alpha, alpha'-azo diproprionitrile, and alpha, alpha'-azodiisobutyronitrile, etc. The promoter is usually used in amounts above 0.001% and below about 5% based on the total weight of monomers, preferably between about 0.001% and 1.0%.

The temperatures of the polymerization reaction will be influenced by the selection of the promoter, since the generation of free radicals at a given temperature depends on the particular properties of the promoting compounds. In general, the useable polymerization temperature range extends from 0° C. to 200° C., preferably from about 30° C. to 160° C. The reaction is preferably conducted at elevated pressures, usually within the range of 10–350 atmospheres and preferably between about 20 and 40 atmospheres, the upper pressure limit being more a matter of economy and convenience rather than a limit imposed by the reaction itself. Generally, the reaction is conducted in a closed system under autogenous pressure, the pressure decreasing as the polymerization reaction proceeds. However, it is often advantageous to carry out the reaction by injecting the monomers in the desired ratio into the reactor during the course of the reaction. If desired, the polymerization can also readily be adopted to continuous operation.

The tetrafluoroethylene is present in the monomer feed mixture in an amount varying from about 50 to about 99 mol percent, usually from 85 to about 99 mol percent. It is a particularly preferred embodiment of this invention to employ a monomer feed mixture containing from about 90 to about 97 mol percent of tetrafluoroethylene. When the monomer feed mixture contains less than about 15 mol percent of the 1,1-dihydroperfluoroalkene-1, the copolymerization reaction produces a copolymer product having exceptionally good characteristics for use in molding applications.

The novel copolymers of this invention contain monomer units corresponding to between about 65 and about 99 mol percent of tetrafluoroethylene and corresponding amounts of 1,1-dihydroperfluoroalkene-1. Those copolymers containing between about 80 and about 97 mol percent of tetrafluoroethylene display outstanding molding and extruding characteristics and have a $Tm$ of between about 250 and about 300° C., in addition to the resistance to chemical and thermal attack usually associated with completely fluorinated polymers, such as tetrafluoroethylene homopolymer. The heat stability of these copolymers is excellent, even though the copolymer "backbone" or carbon chain is only partially fluorinated, i.e., contains hydrogen substituents. Thus, the copolymers of this invention retain their physical properties at temperatures as high as 500° F. and higher. Tensile strengths of the copolymers of this invention range from about 2600 to about 3500 p.s.i., and percent elongations fall in the 225 to 700% range, usually between 400 to 600%. Extrusion into filaments can be effected using conventional techniques, such as forcing the copolymer through a die at temperatures of 300–325° C. under a pressure of 200 p.s.i.

The polymerization is preferably carried out in an aqueous medium. When such an aqueous system is employed, it is usually desirable to add an emulsifying agent. This emulsifying agent is preferably added in the form of a halogenated organic acid or salts thereof having from 6 to 18 carbon atoms per molecule. Typical examples of the halogenated organic acid or salts thereof are polyfluorocarboxylic acids (e.g., perfluorooctanoic acid) or perfluorochlorocarboxylic acid salts (e.g., trifluorochloroethylene telomer acid soaps). Polyfluorocarboxylic acids which may be employed include those disclosed in U.S. Patent No. 2,559,752, and the non-acidic derivatives of the acids disclosed therein as being effective dispersing agents may also be used in the instant polymerization process. Perfluorochlorocarboxylic acid salts which may be used in accordance with this invention include those disclosed in U.S. Patent No. 2,806,867 as being useful dispersing agents in polymerization reactions. In general these emulsifying agents are present in an amount between about 0.5 and about 10 parts by weight per 100 parts of total monomers present.

The polymerization reaction is preferably conducted under neutral conditions. It is desirable, therefore, that the pH be maintained between about 5 and 9 in order to prevent precoagulation of the resulting copolymeric product, a condition which often causes slowdown or stoppage of the polymerization reaction and difficulties in washing and removing impurities from the copolymers. In this respect, it should be noted that it is sometimes necessary to maintain the pH within the aforementioned limits by the addition of suitable buffer agents, such as sodium borate and disodium phosphate.

Finely divided solids can be included in the polymerization mixture and the polymerization carried out in their presence. Examples of such solids or fillers include pigments such as titanium dioxide and carbon black, metals such as copper, aluminum and iron powder, and other materials such as glass, silica, mica, esterified silica, and asbestos. These and other similar materials may also be added to the copolymer product.

The following examples are offered for a better understanding in producing the copolymers of the present invention and are not to be construed as necessarily limiting its scope.

*Example I*

The following recipe was charged to a 300 ml. polymerization vessel:

| | |
|---|---|
| $CF_2=CF_2$ | 38 gm. (0.38 mol). |
| $CF_3CF_2CF=CH_2$ | 3.28 gm. (0.02 mol). |
| $C_7F_{15}\overset{O}{\overset{\|}{C}}ONH_4$ | 1.50 gm. |
| $H_2O$ | 150 gm. |
| $(NH_4)_2S_2O_8$ | 0.75 gm. |
| $(NH_4)_2B_4O_7$ | 0.75 gm. |

The vessel was sealed and reaction allowed to proceed for 5.4 hours at 50° C. under autogenous pressure, during which time the pressure in the vessel dropped from 590 p.s.i.g. to 180 p.s.i.g. When no further drop in pressure occurred, the reaction was considered essentially complete. Upon opening the polymerization vessel, 183 grams of latex containing 17 weight percent solids was recovered and filtered to remove impurities and any small particles of precoagulated latex. The filtered latex was diluted with two volumes of water and coagulated by slow freezing. After the coagulate was recovered, it was washed three times with hot water, three times with hot methanol, and dried under vacuum (60 hours at 75° C.). Approximately 30 grams of dry powdery copolymer was obtained which, after being pressed into clear sheets at temperatures between 540° F. and 600° F., was found to have a ZST at 300° C. of 745 seconds, a tensile strength of 2785 p.s.i., a percent elongation of 460%, and a Tm of 265–270° C. Upon heat aging the pressed sheets at 500° F. for 72 hours, the tensile strength was determined to be 2065 p.s.i. and the percent elongation to be 220%. A weight loss of only 0.25% was noted after aging the powdery copolymer product at 500° F. for 168 hours, and extended heat aging at 500° F., for 288 hours resulted in a weight loss of only 0.75%. The copolymeric product is readily moldable using conventional techniques.

The monomer $CF_3CF_2CF_2=CH_2$ was prepared by the following route:

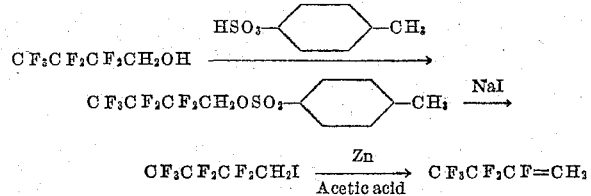

This method is described in greater detail in J.A.C.S., 77, 3149 (1955), by E. T. McBee, D. H. Campbell and C. W. Roberts.

*Example II*

A 300 ml. polymerization vessel was charged with 150 grams of water, 1.50 grams of ammonium perfluorooctanoate, 0.75 gram of ammonium persulfate, 1.50 grams of ammonium borate, and 7.6 grams (0.029 mol) of 1,1-dihydroperfluorohexene-1. The vessel and contents were then frozen in liquid nitrogen, and the vessel was evacuated. 47.5 grams (0.475 mol) of tetrafluoroethylene was condensed into the vessel, after which the vessel was sealed and shaken for 19 hours at 60° C. A total of 203 grams of wet solids were recovered, washed with hot water, hot methanol, and dried in a vacuum oven at 75° C. 52 grams of a white powdery polymer was obtained, which was identified by analytic methods to be a copolymer containing monomer units corresponding to 1,1-dihydroperfluorohexene-1 and tetrafluoroethylene. This copolymeric product was pressed at 600° F. into a translucent, tough, flexible sheet and was readily moldable.

*Example III*

To a 300 ml. polymerization vessel, the following ingredients were charged:

| | (Gm.) |
|---|---|
| $H_2O$ | 150 |
| $C_7F_{15}\overset{O}{\overset{\|}{C}}ONH_4$ | 1.50 |
| $(NH_4)_2S_2O_8$ | 0.75 |
| $(NH_4)_2B_4O_7$ | 0.75 |

With the above system, maintained under a constant pressure of between about 350–400 p.s.i.g., and a temperature of 50° C., 80 grams of $CF_2=CF_2$ (0.8 mol) and 4.17 grams of $CF_3CF_2CF=CH_2$ (0.0248 mol) were introduced into the system over a period of 4.1 hours, the mol ratio of these monomers being maintained at 97/3 respectively. Upon opening the vessel, 184 grams of a latex having a pH of 6.0 was obtained and filtered to remove impurities. Three volumes of water was then added and the diluted latex was coagulated by slow freezing. The recovered coagulate was washed three times with hot water, three times with hot methanol, after which it was dried in a vacuum at 75° C., for an initial period of 3 hours and then at 175° C. for a second period of 16 hours. 31 grams of a white powdery copolymer containing about 95 mol percent of $CF_2=CF_2$ and about 5 mol percent of $CF_3CF_2CF=CH_2$ was obtained. Three samples of this product were pressed at 600° F. into transparent, fused sheets having a ZST at 315° C. of about 309 seconds, a tensile strength of 2980 p.s.i., a percent elongation of 565%, and a T$m$ of 300–305° C. The percent elongation was 480% after heat aging at 500° F. for 100 hours, and the tensile strength was 2520 p.s.i. after aging at 500° F. for 100 hours. Loss of weight of the powdery copolymer product after 40 hours at 500° F. was only 0.25% and was only 1.5% after 160 hours at 500° F. The copolymer product is capable of being molded or extruded by conventional techniques.

*Example IV*

A polymerization run was made using the same procedures and initial recipe as in Example III. Maintaining the vessel under constant pressure, a 95/5 mol ratio charge of $CF_2=CF_2$ and $CF_3CF_2CF=CH_2$ respectively was made over a period of 6.5 hours. 36 grams of dry, powdery copolymer containing about 90 mol percent $CF_2=CF_2$ and about 10 mol percent of $CF_3CF_2CF=CH_2$ was obtained. After being pressed into a tough, clear sheet at temperature of 600° F., the following properties were noted: ZST at 315° C. of 295 seconds, tensile strength of 3060 p.s.i., elongation of 460%, and T$m$ of 280–285° C. Upon heat aging the powdery copolymer product for 100 hours at 500° F. the tensile strength was 2600 p.s.i., and the elongation 340%. At a temperature of 500° F., the copolymer powder had a weight loss of 0.25% in 40 hours and 1.0% in 160 hours. This copolymer displays excellent molding and extruding characteristics.

*Example V*

Using the same initial recipe and procedures described in Example III, a polymerization run was made, using a monomer feed ratio of 96 mol percent $CF_2=CF_2$ to 4 mol percent of $CF_3CF_2CF=CH_2$ and a total monomer charge of 102 grams. After 9 hours at a temperature of 50° C., a latex was produced which, upon removal of the polymer particles therein, resulted in a copolymeric product having about 90 mol perecnt $CF_2=CF_2$ and correspondingly about 10 mol percent $CF_3CF_2CF=CH_2$. A sample of this product, after being pressed into a sheet, had a ZST at 315° C. of 209 seconds, a tensile strength of 3410 p.s.i., a percent elongation of 550%, and a T$m$ of 275–280° C. After 100 hours at 500° F., the tensile strength of the sample was 2005 p.s.i., and its percent elongation was 300%. Loss of weight of the copolymer powder at 550° F., was 0.75% after 100 hours and only 1.0% after 200 hours. The copolymer product is capable of being readily molded and extruded by conventional techniques.

*Example VI*

Using the same batch procedures and recipe as in Example I, but charging 60 grams of monomer in a 90/10 ratio of $CF_2=CF_2/CF_3CF_2CF=CH_2$, a run was made at a temperature of 60° C., for 10 hours. A powdery copolymer having about 80 mol percent $CF_2=CF_2$ and about 20 mol percent $CF_3CF_2CF=CH_2$ was obtained (20% solids in latex). A pressed sheet of the copolymer was moderately tough and was capable of being molded by conventional techniques.

Similar results are obtained when 1,1-dihydroperfluorohexene-1 and 1,1-dihydroperfluoropentene-1 are substituted for 1,1-dihydroperfluorobutene-1 in the above examples.

As previously indicated, the copolymers of this invention possess highly desirable physical and chemical properties which make them useful for molding and extruding into a wide variety of shapes. Products which can be manufactured from these copolymers include gaskets, pipe, gears, mechanical parts, including intricate forms, wire filaments, electrical insulation, rods, etc.

As many widely different embodiments of this invention may be made without departing from the spirit and scope thereof, it is to be understood that the invention is not limited to the specific embodiments appearing herein.

We claim:

1. A heat resistant, moldable, thermoplastic copolymer of between about 80 and about 97 mol percent of tetrafluoroethylene and between about 3 and about 20 mol percent of a 1,1-dihydroperfluoroalkene-1 having between 4 and 6 carbon atoms.

2. The copolymer of claim 1 in which the 1,1-dihydroperfluoroalkene-1 is 1,1-dihydroperfluorobutene-1.

3. A process which comprises polymerizing at a temperature between about 30° C. to about 160° C. a monomer mixture of between about 80 and about 99 mol percent of tetrafluoroethylene and between about 1 and about 20 mol percent of a 1,1-dihydroperfluoroalkene-1 having between 4 and 6 carbon atoms in an aqueous medium containing a free radical forming polymerization promoter.

4. A process which comprises polymerizing at a temperature between about 30° C. to about 160° C. a monomer mixture having between about 90 and about 97 mol percent of tetrafluoroethylene and between about 3 and about 10 mol percent of a 1,1-dihydroperfluoroalkene-1 having between 4 and 6 carbon atoms, in an aqueous medium containing a free radical forming polymerization promoter.

5. A heat resistant, moldable thermoplastic copolymer of between about 90 and about 97 mol percent of tetrafluoroethylene and between about 3 and about 10 mol percent of a 1,1-dihydroperfluoroalkene-1 having between 4 and 6 carbon atoms.

6. The copolymer of claim 5 in which the 1,1-dihydroperfluoroalkene-1 is 1,1-dihydroperfluorobutene-1.

References Cited in the file of this patent

UNITED STATES PATENTS

| | | |
|---|---|---|
| 2,784,176 | Dittman et al. | Mar. 5, 1957 |
| 2,907,795 | Wolff | Oct. 6, 1959 |
| 2,931,840 | Marquis | Apr. 5, 1960 |

OTHER REFERENCES

McBee et al.: J.A.C.S. 77, pp. 3149–3151 (1955).